(12) United States Patent
Singh et al.

(10) Patent No.: US 12,474,729 B2
(45) Date of Patent: Nov. 18, 2025

(54) ON-CHIP CLOCK FREQUENCY ANALYSIS TECHNIQUES

(71) Applicant: Intel Corporation, Santa Clara, CA (US)

(72) Inventors: Santosh Kumar Singh, Bengaluru (IN); Krishnan Ananthanarayanan, Palakkad (IN)

(73) Assignee: Intel Corporation, Santa Clara, CA (US)

( * ) Notice: Subject to any disclaimer, the term of this patent is extended or adjusted under 35 U.S.C. 154(b) by 752 days.

(21) Appl. No.: 17/562,795

(22) Filed: Dec. 27, 2021

(65) Prior Publication Data

US 2023/0205251 A1 Jun. 29, 2023

(51) Int. Cl.
*G06F 1/04* (2006.01)

(52) U.S. Cl.
CPC ..................................... *G06F 1/04* (2013.01)

(58) Field of Classification Search
CPC ... G06F 1/04; G06F 11/1604; G06F 2205/061
See application file for complete search history.

(56) References Cited

U.S. PATENT DOCUMENTS

| | | | | |
|---|---|---|---|---|
| 2007/0012522 A1* | 1/2007 | Chida | ....................... | B66B 1/34 187/393 |
| 2008/0117157 A1* | 5/2008 | Hwang | ................ | G09G 3/3611 345/92 |
| 2011/0074514 A1* | 3/2011 | Marutani | ................ | H03L 7/183 324/76.39 |
| 2013/0169347 A1* | 7/2013 | Kim | ........................ | G06F 1/206 327/513 |
| 2014/0191785 A1* | 7/2014 | Kim | ........................ | H03L 1/027 327/113 |
| 2014/0254229 A1* | 9/2014 | Kopf | ..................... | H02M 7/539 363/132 |
| 2021/0085886 A1* | 3/2021 | Rolfe | ................ | A61M 5/31546 |
| 2023/0072903 A1* | 3/2023 | O'Shea | ..................... | G06F 1/08 |

* cited by examiner

*Primary Examiner* — Hyun Soo Kim
(74) *Attorney, Agent, or Firm* — Nicholson De Vos Webster & Elliott LLP

(57) ABSTRACT

Systems or methods of the present disclosure may provide for analyzing or monitoring one or more frequencies of one or more clocks. For example, a clock analysis system includes a control register that stores a frequency indication for a first clock, and an edge counter and a window counter that count respective numbers of edges of the first clock and a second clock within a particular window. The clock analysis system also includes a status register that stores indications of the number of edges from the edge counter and the window counter. The clock analysis system further includes an application processor that determines a ratio between the number of edges of the first clock and the number of edges of the second clock, determines a frequency of the first clock based on the ratio, and transmits an indication of the frequency to a peripheral device for display.

17 Claims, 12 Drawing Sheets

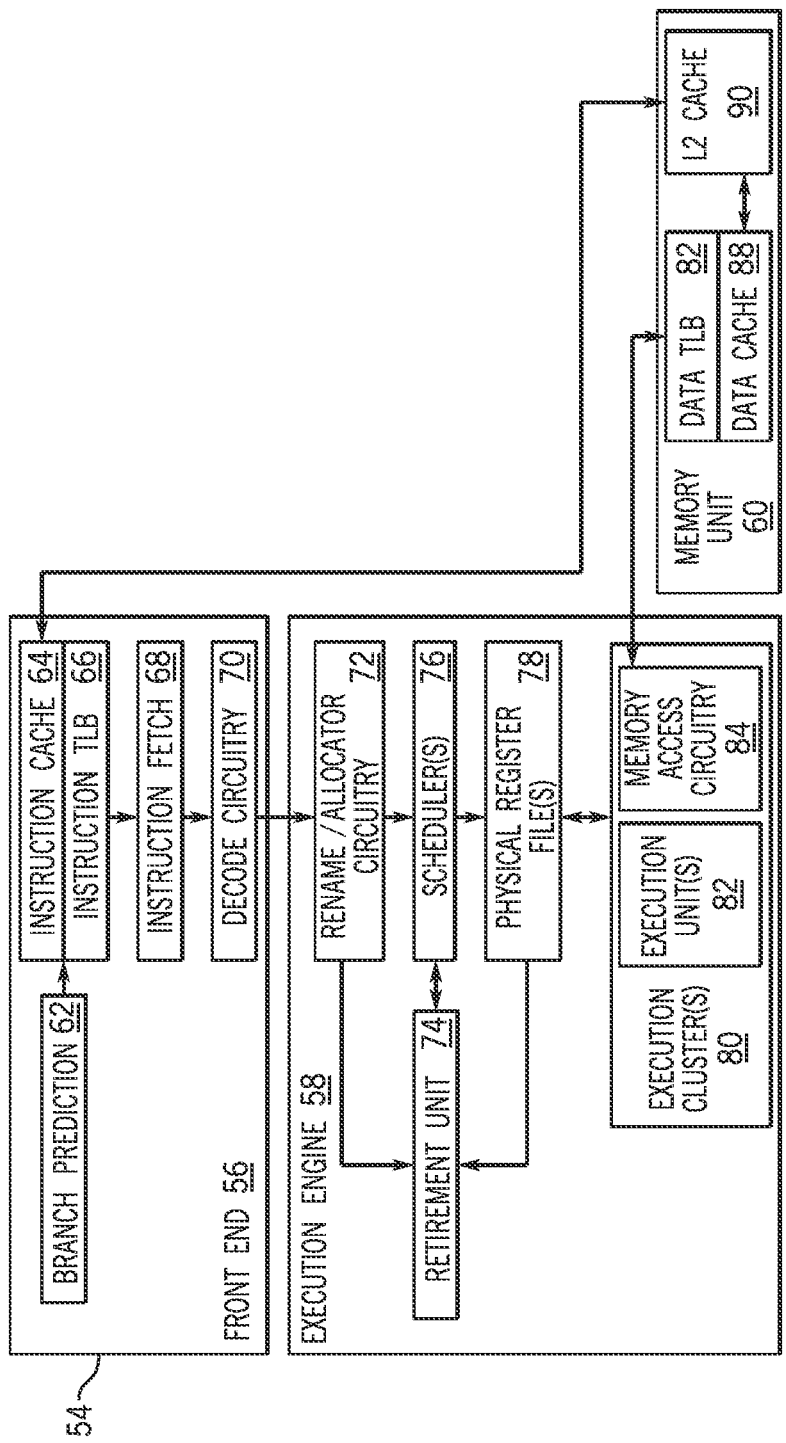

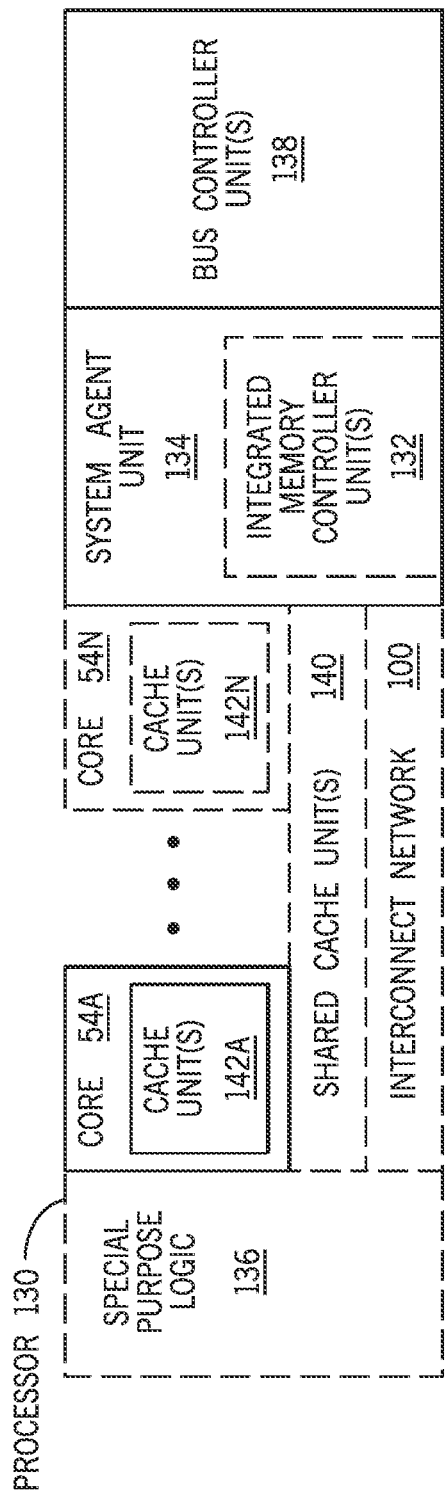

ON-CHIP CLOCK FREQUENCY ANALYSIS TECHNIQUES

BACKGROUND

The present disclosure relates generally to analyzing clock frequencies for processors (e.g., systems-on-chips (SoCs)). More particularly, the present disclosure relates to a software application that may be executed by the SoCs to automatically determine clock frequencies of various clocks of the SoCs.

An SoC uses a clock generator to produce one or more clock signals to synchronize operation of the SoC. In order to monitor or maintain the accuracy of such clock signals, the frequencies of each clock signal may be measured using an oscilloscope. However, measuring clock frequencies of SoCs using an oscilloscope is typically unavailable after the chips associated with the SoCs have been distributed from a manufacturer. Additionally, validating the clock signals typically requires manually configuring each clock signal individually before distribution of the SoCs from the manufacturer.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

BRIEF DESCRIPTION OF THE DRAWINGS

Various aspects of this disclosure may be better understood upon reading the following detailed description and upon reference to the drawings in which:

FIG. 2A is a block diagram illustrating an in-order pipeline and a register renaming, out-of-order issue/execution pipeline, in accordance with an embodiment of the present disclosure;

FIG. 2B is a block diagram illustrating an in-order architecture core and a register renaming, out-of-order issue/execution architecture core to be included in a processor, in accordance with an embodiment of the present disclosure;

FIG. 4 is a block diagram of a processor that may have more than one core, may have an integrated memory controller, and may have integrated graphics, in accordance with an embodiment of the present disclosure;

DETAILED DESCRIPTION OF THE EMBODIMENTS

One or more specific embodiments will be described below. To provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Register Architecture

Figure 1:
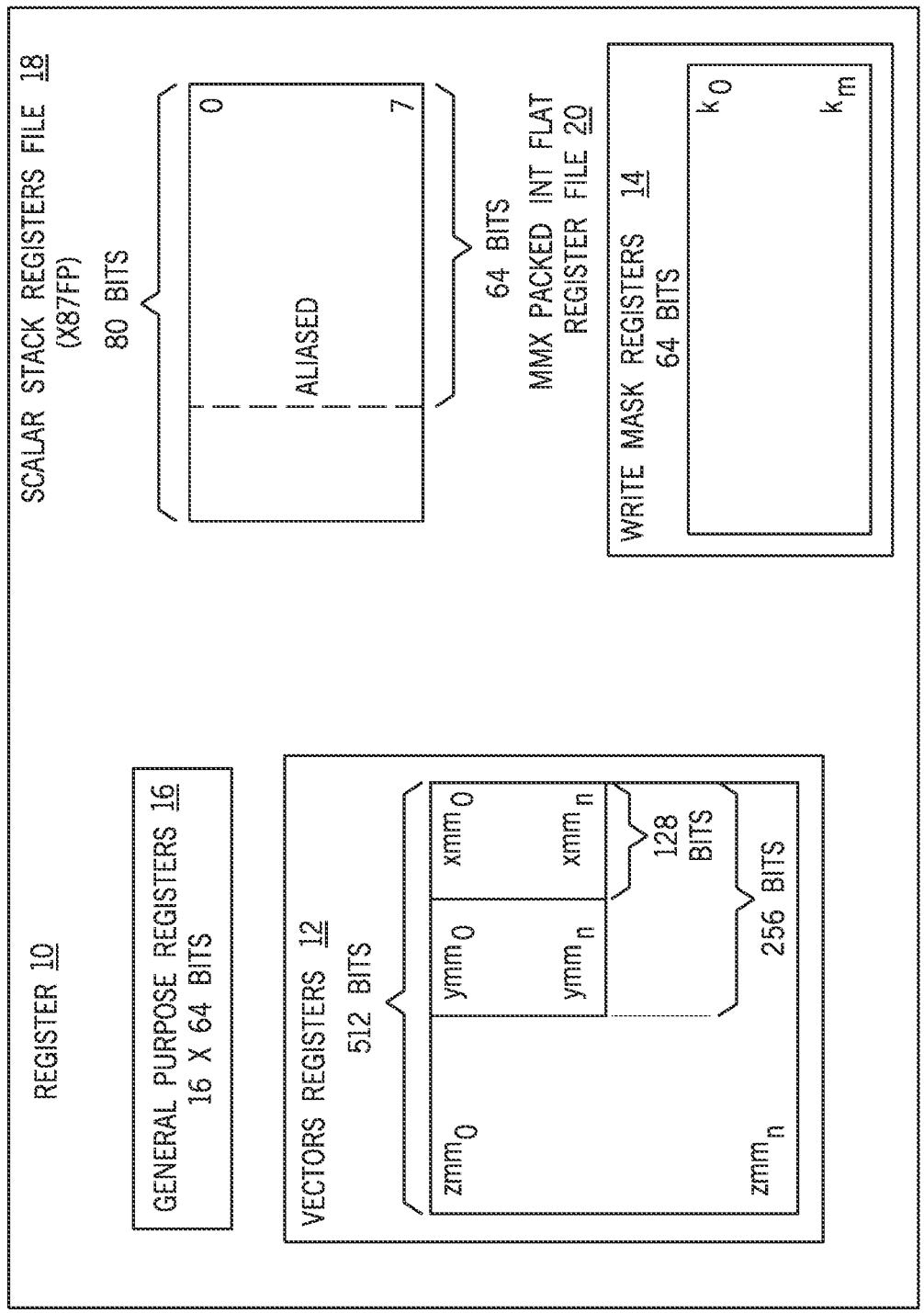
FIG. 1 is a block diagram of a register architecture, in accordance with an embodiment of the present disclosure.

FIG. 1 is a block diagram of a register architecture 10, in accordance with an embodiment of the present disclosure. In the embodiment illustrated, there are a number (e.g., 32) of vector registers 12 that may be a number (e.g., 512) of bits wide. In the register architecture 10; these registers are referenced as zmm0 through zmmi. The lower order (e.g., 256) bits of the lower n (e.g., 16) zmm registers are overlaid on corresponding registers ymm. The lower order (e.g., 128 bits) of the lower n zmm registers that are also the lower order n bits of the ymm registers are overlaid on corresponding registers xmm.

Write mask registers 14 may include m (e.g., 8) write mask registers (k0 through km), each having a number (e.g., 64) of bits. Additionally, or alternatively, at least some of the write mask registers 14 may have a different size (e.g., 16 bits). At least some of the vector registers 12 (e.g., k0) are prohibited from being used as a write mask. When such vector mask registers are indicated, a hardwired write mask (e.g., 0xFFFF) is selected and, effectively disabling write masking for that instruction.

General-purpose registers 16 may include a number (e.g., 16) of registers having corresponding bit sizes (e.g., 64) that are used along with x86 addressing modes to address memory operands. These registers may be referenced by the names RAX, RBX, RCX, RDX, RBP, RSI, RDI, RSP, and R8 through R15. Parts (e.g., 32 bits of the registers) of at least some of these registers may be used for modes (e.g., 32-bit mode) that is shorter than the complete length of the registers.

Scalar floating-point stack register file (x87 stack) 18 has an MMX packed integer flat register file 20 is aliased. The x87 stack 18 is an eight-element (or other number of elements) stack used to perform scalar floating-point operations on floating point data using the x87 instruction set extension. The floating-point data may have various levels of precision (e.g., 16, 32, 64, 80, or more bits). The MMX packed integer flat register files 20 are used to perform operations on 64-bit packed integer data, as well as to hold operands for some operations performed between the MMX packed integer flat register files 20 and the XMM registers.

Alternative embodiments may use wider or narrower registers. Additionally, alternative embodiments may use more, less, or different register files and registers.

Core Architectures, Processors, and Computer Architectures

Processor cores may be implemented in different ways, for different purposes, and in different processors. For instance, implementations of such cores may include: 1) a general purpose in-order core suitable for general-purpose computing; 2) a high-performance general purpose out-of-order core suitable for general-purpose computing; 3) a special purpose core suitable for primarily for graphics and/or scientific (throughput) computing. Implementations of different processors may include: 1) a CPU including one or more general purpose in-order cores suitable for general-purpose computing and/or one or more general purpose out-of-order cores suitable for general-purpose computing; and 2) a coprocessor including one or more special purpose cores primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

In-Order and Out-of-Order Core Architecture

FIG. 2A is a block diagram illustrating an in-order pipeline and a register renaming, out-of-order issue/execution pipeline according to an embodiment of the disclosure. FIG. 2B is a block diagram illustrating both an embodiment of an in-order architecture core and an exemplary register renaming, out-of-order issue/execution architecture core to be included in a processor according to embodiments. The solid lined boxes in FIGS. 2A and 2B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 2A, a pipeline 30 in the processor includes a fetch stage 32, a length decode stage 34, a decode stage 36, an allocation stage 38, a renaming stage 40, a scheduling (also known as a dispatch or issue) stage 42, a register read/memory read stage 44, an execute stage 46, a write back/memory write stage 48, an exception handling stage 50, and a commit stage 52.

FIG. 2B shows a processor core 54 including a front-end unit 56 coupled to an execution engine unit 58, and both are coupled to a memory unit 60. The processor core 54 may be a reduced instruction set computing (RISC) core, a complex instruction set computing (CISC) core, a very long instruction word (VLIW) core, or other core types. As yet another option, the processor core 54 may be a special-purpose core, such as, for example, a network or communication core, compression engine, coprocessor core, general purpose computing graphics processing unit (GPGPU) core, graphics core, or the like.

The front-end unit 56 includes a branch prediction unit 62 coupled to an instruction cache unit 64 that is coupled to an instruction translation lookaside buffer (TLB) 66. The TLB 66 is coupled to an instruction fetch unit 68. The instruction fetch unit 68 is coupled to a decode circuitry 70. The decode circuitry 70 (or decoder) may decode instructions and generate as an output one or more micro-operations, micro-code entry points, microinstructions, other instructions, or other control signals, which are decoded from, or which otherwise reflect, or are derived from, the original instructions. The decode circuitry 70 may be implemented using various different mechanisms. Examples of suitable mechanisms include, but are not limited to, look-up tables, hardware implementations, programmable logic arrays (PLAs), microcode read only memories (ROMs), etc. The processor core 54 may include a microcode ROM or other medium that stores microcode for macroinstructions (e.g., in decode circuitry 70 or otherwise within the front-end unit 56). The decode circuitry 70 is coupled to a rename/allocator unit 72 in the execution engine unit 58.

The execution engine unit 58 includes a rename/allocator unit 72 coupled to a retirement unit 74 and a set of one or more scheduler unit(s) 76. The scheduler unit(s) 76 represents any number of different schedulers, including reservations stations, central instruction window, etc. The scheduler unit(s) 76 is coupled to physical register file(s) unit(s) 78. Each of the physical register file(s) unit(s) 78 represents one or more physical register files storing one or more different data types, such as scalar integers, scalar floating points, packed integers, packed floating points, vector integers, vector floating points, statuses (e.g., an instruction pointer that is the address of the next instruction to be executed), etc. In one embodiment, the physical register file(s) unit(s) 78 includes the vector registers 12, the write mask registers 14, and/or the x87 stack 18. These register units may provide architectural vector registers, vector mask registers, and general-purpose registers. The physical register file(s) unit(s) 78 is overlapped by the retirement unit 74 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.).

The retirement unit 74 and the physical register file(s) unit(s) 78 are coupled to an execution cluster(s) 80. The execution cluster(s) 80 includes a set of one or more execution units 82 and a set of one or more memory access circuitries 84. The execution units 82 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform multiple different functions. The scheduler unit(s) 76, physical register file(s) unit(s) 78, and execution cluster(s) 80 are shown as being singular or plural because some processor cores 54 create separate pipelines for certain types of data/ operations (e.g., a scalar integer pipeline, a scalar floating point/packed integer/packed floating point/vector integer/ vector floating point pipeline, and/or a memory access pipeline that each have their own scheduler unit, physical register file(s) unit, and/or execution cluster. In the case of a separate memory access pipeline, a processor core 54 for the separate memory access pipeline is the only the execution cluster 80 that has the memory access circuitry 84). It should also be understood that where separate pipelines are used, one or more of these pipelines may be out-of-order issue/execution and the rest perform in-order execution.

The set of memory access circuitry 84 is coupled to the memory unit 60. The memory unit 60 includes a data TLB unit 86 coupled to a data cache unit 88 coupled to a level 2 (L2) cache unit 90. The memory access circuitry 84 may include a load unit, a store address unit, and a store data unit, each of which is coupled to the data TLB unit 86 in the memory unit 60. The instruction cache unit 64 is further coupled to the level 2 (L2) cache unit 90 in the memory unit 60. The L2 cache unit 90 is coupled to one or more other levels of caches and/or to a main memory.

By way of example, the register renaming, out-of-order issue/execution core architecture may implement the pipeline 30 as follows: 1) the instruction fetch unit 68 performs the fetch and length decoding stages 32 and 34 of the pipeline 30; 2) the decode circuitry 70 performs the decode stage 36 of the pipeline 30; 3) the rename/allocator unit 72 performs the allocation stage 38 and renaming stage 40 of the pipeline; 4) the scheduler unit(s) 76 performs the scheduling stage 42 of the pipeline 30; 5) the physical register file(s) unit(s) 78 and the memory unit 60 perform the register read/memory read stage 44 of the pipeline 30; the execution cluster 80 performs the execute stage 46 of the pipeline 30; 6) the memory unit 60 and the physical register file(s) unit(s) 78 perform the write back/memory write stage 48 of the pipeline 30; 7) various units may be involved in the exception handling stage 50 of the pipeline; and/or 8) the retirement unit 74 and the physical register file(s) unit(s) 78 perform the commit stage 52 of the pipeline 30.

The processor core 54 may support one or more instructions sets, such as an x86 instruction set (with or without additional extensions for newer versions); a MIPS instruction set of MIPS Technologies of Sunnyvale, CA; an ARM instruction set (with optional additional extensions such as NEON) of ARM Holdings of Sunnyvale, CA). Additionally, or alternatively, the processor core 54 includes logic to support a packed data instruction set extension (e.g., AVX1, AVX2), thereby allowing the operations used by multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multi- threading), or a combination thereof, such as a time-sliced fetching and decoding and simultaneous multithreading in INTEL® Hyperthreading technology.

While register renaming is described in the context of out-of-order execution, register renaming may be used in an in-order architecture. While the illustrated embodiment of the processor also includes a separate instruction cache unit 64, a separate data cache unit 88, and a shared L2 cache unit 90, some processors may have a single internal cache for both instructions and data, such as, for example, a Level 1 (L1) internal cache, or multiple levels of the internal cache. In some embodiments, the processor may include a combination of an internal cache and an external cache that is external to the processor core 54 and/or the processor. Alternatively, some processors may use a cache that is external to the processor core 54 and/or the processor.

Figure 3B:
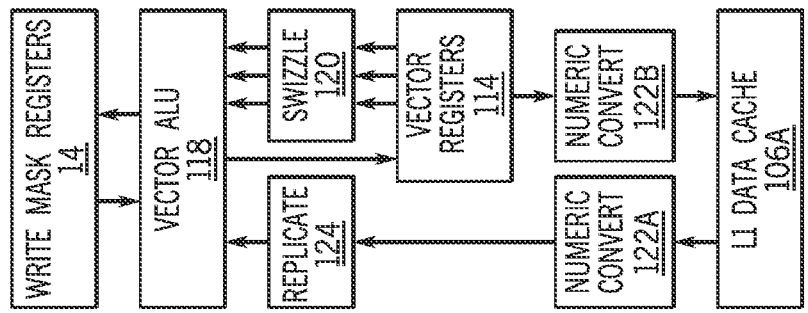
FIGS. 3A and 3B illustrate a block diagram of a more specific exemplary in-order core architecture, which core would be one of several logic blocks (including other cores of the same type and/or different types) in a chip, in accordance with an embodiment of the present disclosure.
Figure 3A:
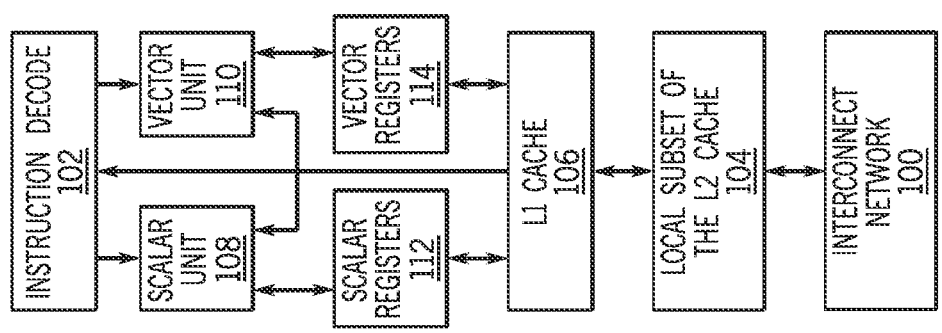

FIGS. 3A and 3B illustrate more detailed block diagrams of an in-order core architecture. The processor core 54 includes one or more logic blocks (including other cores of the same type and/or different types) in a chip. The logic blocks communicate through a high-bandwidth interconnect network (e.g., a ring network) with some fixed function logic, memory I/O interfaces, and other I/O logic, depending on the application.

FIG. 3A is a block diagram of a single processor core 54, along with its connection to an on-die interconnect network 100 and with its local subset of the Level 2 (L2) cache 104, according to embodiments of the disclosure. In one embodiment, an instruction decoder 102 supports the x86 instruction set with a packed data instruction set extension. An L1 cache 106 allows low-latency accesses to cache memory into the scalar and vector units. While in one embodiment (to simplify the design), a scalar unit 108 and a vector unit 110 use separate register sets (respectively, scalar registers 112 (e.g., x87 stack 18) and vector registers 114 (e.g., vector registers 12) and data transferred between them is written to memory and then read back in from a level 1 (L1) cache 106, alternative embodiments of the disclosure may use a different approach (e.g., use a single register set or include a communication path that allow data to be transferred between the two register files without being written and read back).

The local subset of the L2 cache 104 is part of a global L2 cache unit 90 that is divided into separate local subsets, one per processor core. Each processor core 54 has a direct access path to its own local subset of the L2 cache 104. Data read by a processor core 54 is stored in its L2 cache 104 subset and can be accessed quickly, in parallel with other processor cores 54 accessing their own local L2 cache subsets. Data written by a processor core 54 is stored in its own L2 cache 104 subset and is flushed from other subsets, if necessary. The interconnection network 100 ensures coherency for shared data. The interconnection network 100 is bi-directional to allow agents such as processor cores, L2 caches, and other logic blocks to communicate with each other within the chip. Each data-path may have a number (e.g., 1012) of bits in width per direction.

FIG. 3B is an expanded view of part of the processor core in FIG. 3A according to embodiments of the disclosure. FIG. 3B includes an L1 data cache 106A part of the L1 cache 106, as well as more detail regarding the vector unit 110 and the vector registers 114. Specifically, the vector unit 110 may be a vector processing unit (VPU) (e.g., a vector arithmetic logic unit (ALU) 118) that executes one or more of integer, single-precision float, and double-precision float instructions. The VPU supports swizzling the register inputs with swizzle unit 120, numeric conversion with numeric convert units 122A and 122B, and replication with replication unit 124 on the memory input. The write mask registers 14 allow predicating resulting vector writes.

FIG. 4 is a block diagram of a processor 130 that may have more than one processor core 54, may have an integrated memory controller unit(s) 132, and may have integrated graphics according to embodiments of the disclosure. The solid lined boxes in FIG. 4 illustrate a processor 130 with a single core 54A, a system agent unit 134, a set of one or more bus controller unit(s) 138, while the optional addition of the dashed lined boxes illustrates the processor 130 with multiple cores 54A-N, a set of one or more integrated memory controller unit(s) 132 in the system agent unit 134, and a special purpose logic 136.

Thus, different implementations of the processor 130 may include: 1) a CPU with the special purpose logic 136 being integrated graphics and/or scientific (throughput) logic (which may include one or more cores), and the cores 54A-N being one or more general purpose cores (e.g., general purpose in-order cores, general purpose out-of-order cores, or a combination thereof); 2) a coprocessor with the cores 54A-N being a relatively large number of special purpose cores intended primarily for graphics and/or scientific (throughput); and 3) a coprocessor with the cores 54A-N being a relatively large number of general purpose in-order cores. Thus, the processor 130 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), an embedded processor, or the like. The processor 130 may be implemented on one or more chips. The processor 130 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 140, and external memory (not shown) coupled to the set of integrated memory controller unit(s) 132. The set of shared cache units 140 may include one or more mid-level caches, such as level 2 (L2), level 3 (L3), level 4 (L4), or other levels of cache, a last level cache (LLC), and/or combinations thereof. While a ring-based interconnect network 100 may interconnect the integrated graphics logic 136 (integrated graphics logic 136 is an example of and is also referred to herein as special purpose logic 136), the set of shared cache units 140, and/or the system agent unit 134/integrated memory controller unit(s) 132 may use any number of known techniques for interconnecting such units. For example, coherency may be maintained between one or more cache units 142A-N and cores 54A-N.

In some embodiments, one or more of the cores 54A-N are capable of multi-threading. The system agent unit 134 includes those components coordinating and operating cores 54A-N. The system agent unit 134 may include, for example, a power control unit (PCU) and a display unit. The PCU may be or may include logic and components used to regulate the power state of the cores 54A-N and the integrated graphics logic 136. The display unit is used to drive one or more externally connected displays.

The cores 54A-N may be homogenous or heterogeneous in terms of architecture instruction set. That is, two or more of the cores 54A-N may be capable of execution of the same instruction set, while others may be capable of executing only a subset of a single instruction set or a different instruction set.

Computer Architecture

FIGS. 5-8 are block diagrams of embodiments of computer architectures. These architectures may be suitable for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, handheld devices, and various other electronic devices. In general, a wide variety of systems or electronic devices capable of incorporating the processor 130 and/or other execution logic.

Figure 5:
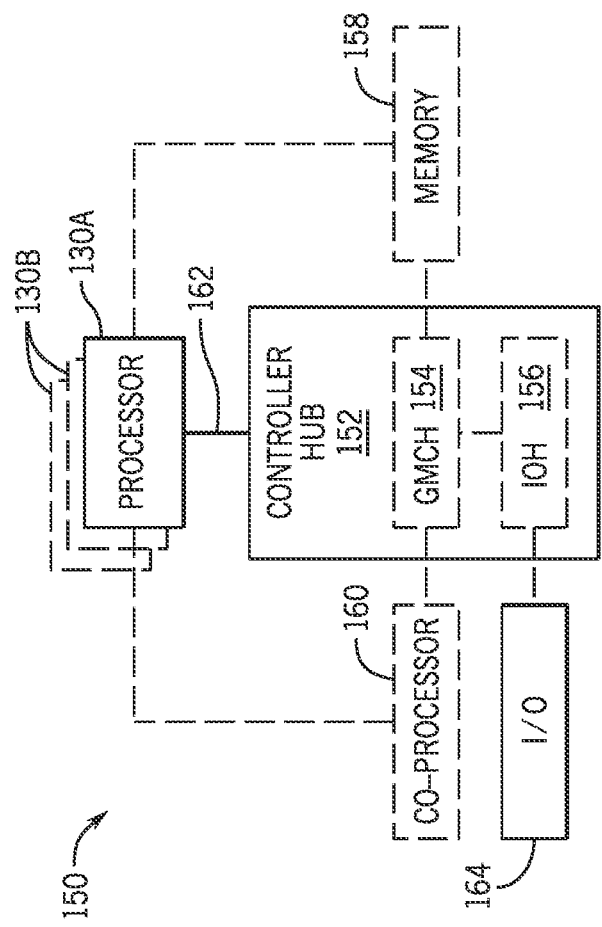
FIG. 5 shown a block diagram of a system, in accordance with an embodiment of the present disclosure.

Referring now to FIG. 5, shown is a block diagram of a system 150 in accordance with an embodiment of the present disclosure. The system 150 may include one or more processors 130A, 130B that is coupled to a controller hub 152. The controller hub 152 may include a graphics memory controller hub (GMCH) 154 and an Input/Output Hub (IOH) 156 (which may be on separate chips); the GMCH 154 includes memory and graphics controllers to which are coupled memory 158 and a coprocessor 160; the IOH 156 couples input/output (I/O) devices 164 to the GMCH 154. Alternatively, one or both of the memory and graphics controllers are integrated within the processor 130 (as described herein), the memory 158 and the coprocessor 160 are coupled to (e.g., directly to) the processor 130A, and the controller hub 152 in a single chip with the IOH 156.

The optional nature of an additional processor 130B is denoted in FIG. 5 with broken lines. Each processor 130A, 130B may include one or more of the processor cores 54 described herein and may be some version of the processor 130.

The memory 158 may be, for example, dynamic random-access memory (DRAM), phase change memory (PCM), or a combination thereof. For at least one embodiment, the controller hub 152 communicates with the processor(s) 130A, 130B via a multi-drop bus, such as a frontside bus (FSB), point-to-point interface such as QuickPath Interconnect (QPI), or similar connection 162.

In one embodiment, the coprocessor 160 is a special-purpose processor, such as, for example, a high-throughput MIC processor, a network or communication processor, a compression engine, a graphics processor, a GPGPU, an embedded processor, or the like. In an embodiment, the controller hub 152 may include an integrated graphics accelerator.

There can be a variety of differences between the physical resources of the processors 130A, 130B in terms of a spectrum of metrics of merit including architectural, micro-architectural, thermal, power consumption characteristics, and the like.

In some embodiments, the processor 130A executes instructions that control data processing operations of a general type. Embedded within the instructions may be coprocessor instructions. The processor 130A recognizes these coprocessor instructions as being of a type that should be executed by the attached coprocessor 160. Accordingly, the processor 130A issues these coprocessor instructions (or control signals representing coprocessor instructions) on a coprocessor bus or other interconnect, to the coprocessor 160. The coprocessor 160 accepts and executes the received coprocessor instructions.

Figure 6:
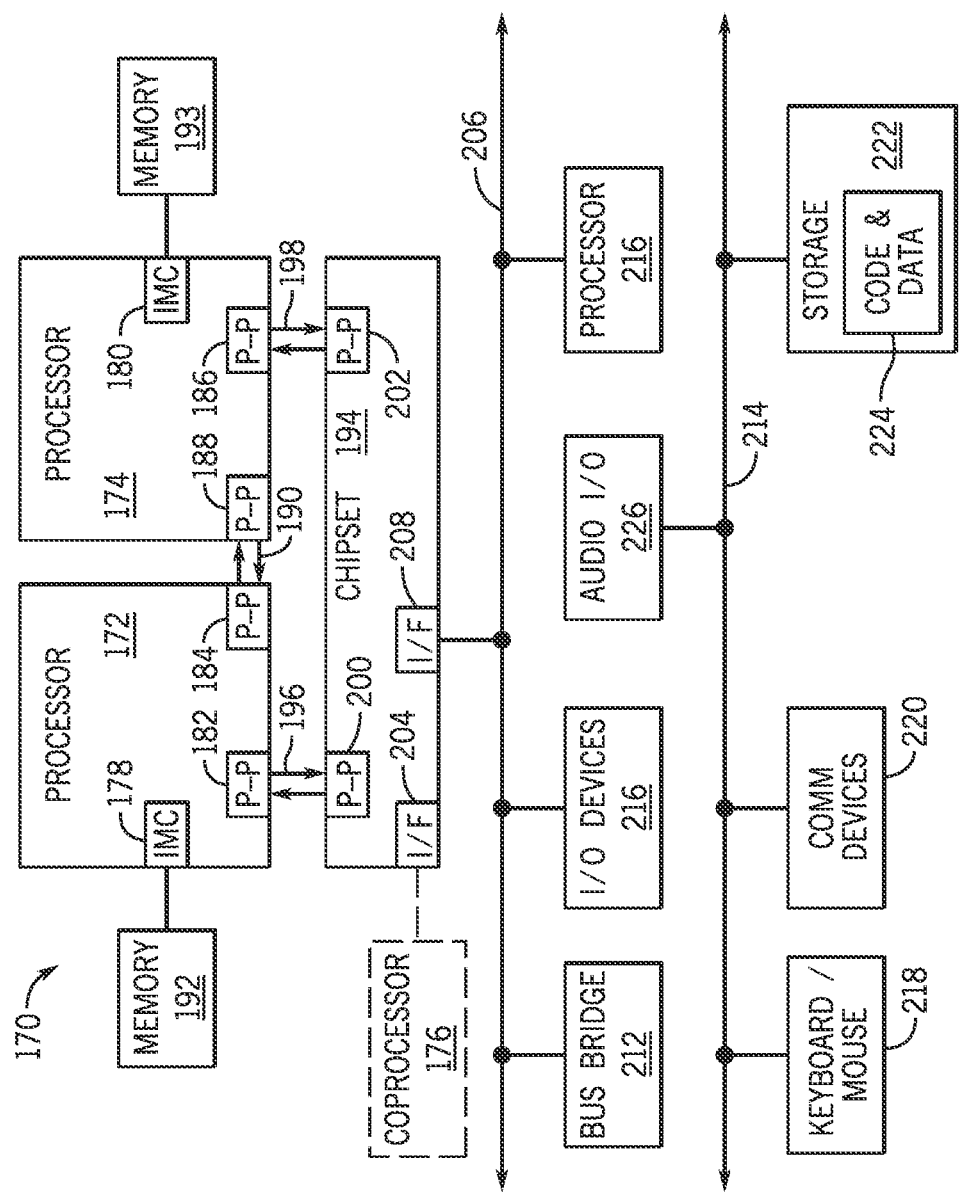
FIG. 6 is a block diagram of a first more specific exemplary system, in accordance with an embodiment of the present disclosure.

Referring now to FIG. 6, shown is a more detailed block diagram of a multiprocessor system 170 in accordance with an embodiment of the present disclosure. As shown in FIG. 6, the multiprocessor system 170 is a point-to-point interconnect system, and includes a processor 172 and a processor 174 coupled via a point-to-point interface 190. Each of processors 172 and 174 may be some version of the processor 130. In one embodiment of the disclosure, processors 172 and 174 are respectively processors 130A and 130B, while coprocessor 176 is coprocessor 160. In another embodiment, processors 172 and 174 are respectively processor 130A and coprocessor 160.

Processors 172 and 174 are shown including integrated memory controller (IMC) units 178 and 180, respectively. The processor 172 also includes point-to-point (P-P) interfaces 182 and 184 as part of its bus controller units. Similarly, the processor 174 includes P-P interfaces 186 and 188. The processors 172, 174 may exchange information via a point-to-point interface 190 using P-P interfaces 184, 188. As shown in FIG. 6, IMCs 178 and 180 couple the processors to respective memories, namely a memory 192 and a memory 193 that may be different portions of main memory locally attached to the respective processors 172, 174.

Processors 172, 174 may each exchange information with a chipset 194 via individual P-P interfaces 196, 198 using point-to-point interfaces 182, 200, 186, 202. Chipset 194 may optionally exchange information with the coprocessor 176 via a high-performance interface 204. In an embodiment, the coprocessor 176 is a special-purpose processor, such as, for example, a high-throughput MIC processor, a network or communication processor, a compression engine, a graphics processor, a GPGPU, an embedded processor, or the like.

A shared cache (not shown) may be included in either processor 172 or 174 or outside of both processors 172 or 174 that is connected with the processors 172, 174 via respective P-P interconnects such that either or both processors' local cache information may be stored in the shared cache if a respective processor is placed into a low power mode.

The chipset 194 may be coupled to a first bus 206 via an interface 208. In an embodiment, the first bus 206 may be a Peripheral Component Interconnect (PCI) bus or a bus such as a PCI Express bus or another third generation I/O interconnect bus, although the scope of the present disclosure is not so limited.

As shown in FIG. 6, various I/O devices 210 may be coupled to first bus 206, along with a bus bridge 212 that couples the first bus 206 to a second bus 214. In an embodiment, one or more additional processor(s) 216, such as coprocessors, high-throughput MIC processors, GPGPUs, accelerators (such as, e.g., graphics accelerators or digital signal processing (DSP) units), field programmable gate arrays, or any other processors, are coupled to the first bus 206. In an embodiment, the second bus 214 may be a low pin count (LPC) bus. Various devices may be coupled to the second bus 214 including, for example, a keyboard and/or mouse 218, communication devices 220 and a storage unit 222 such as a disk drive or other mass storage device which may include instructions/code and data 224, in an embodiment. Further, an audio I/O 226 may be coupled to the second bus 214. Note that other architectures may be deployed for the multiprocessor system 170. For example, instead of the point-to-point architecture of FIG. 6, the multiprocessor system 170 may implement a multi-drop bus or other such architectures.

Figure 7:
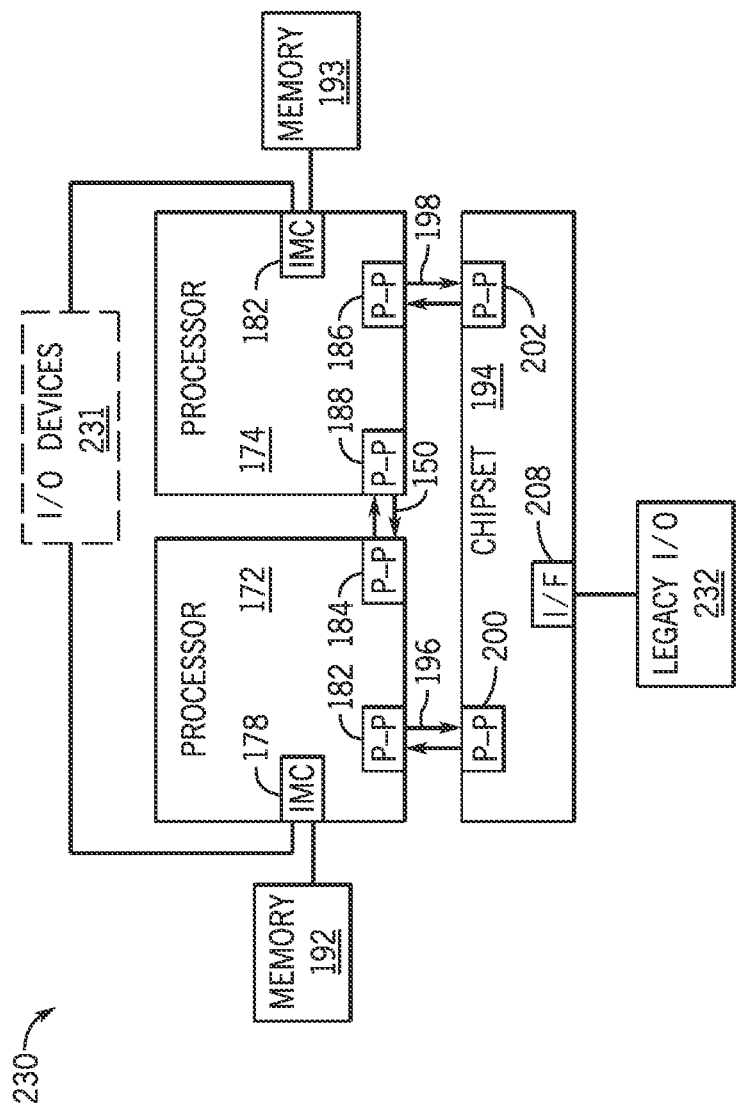
FIG. 7 is a block diagram of a second more specific exemplary system, in accordance with an embodiment of the present disclosure.

Referring now to FIG. 7, shown is a block diagram of a system 230 in accordance with an embodiment of the present disclosure. Like elements in FIGS. 7 and 8 contain like reference numerals, and certain aspects of FIG. 6 have been omitted from FIG. 7 to avoid obscuring other aspects of FIG. 7.

FIG. 7 illustrates that the processors 172, 174 may include integrated memory and I/O control logic ("IMC") 178 and 180, respectively. Thus, the IMC 178, 180 include integrated memory controller units and include I/O control logic. FIG. 7 illustrates that not only are the memories 192, 193 coupled to the IMC 178, 180, but also that I/O devices 231 are also coupled to the IMC 178, 180. Legacy I/O devices 232 are coupled to the chipset 194 via the interface 208.

Figure 8:
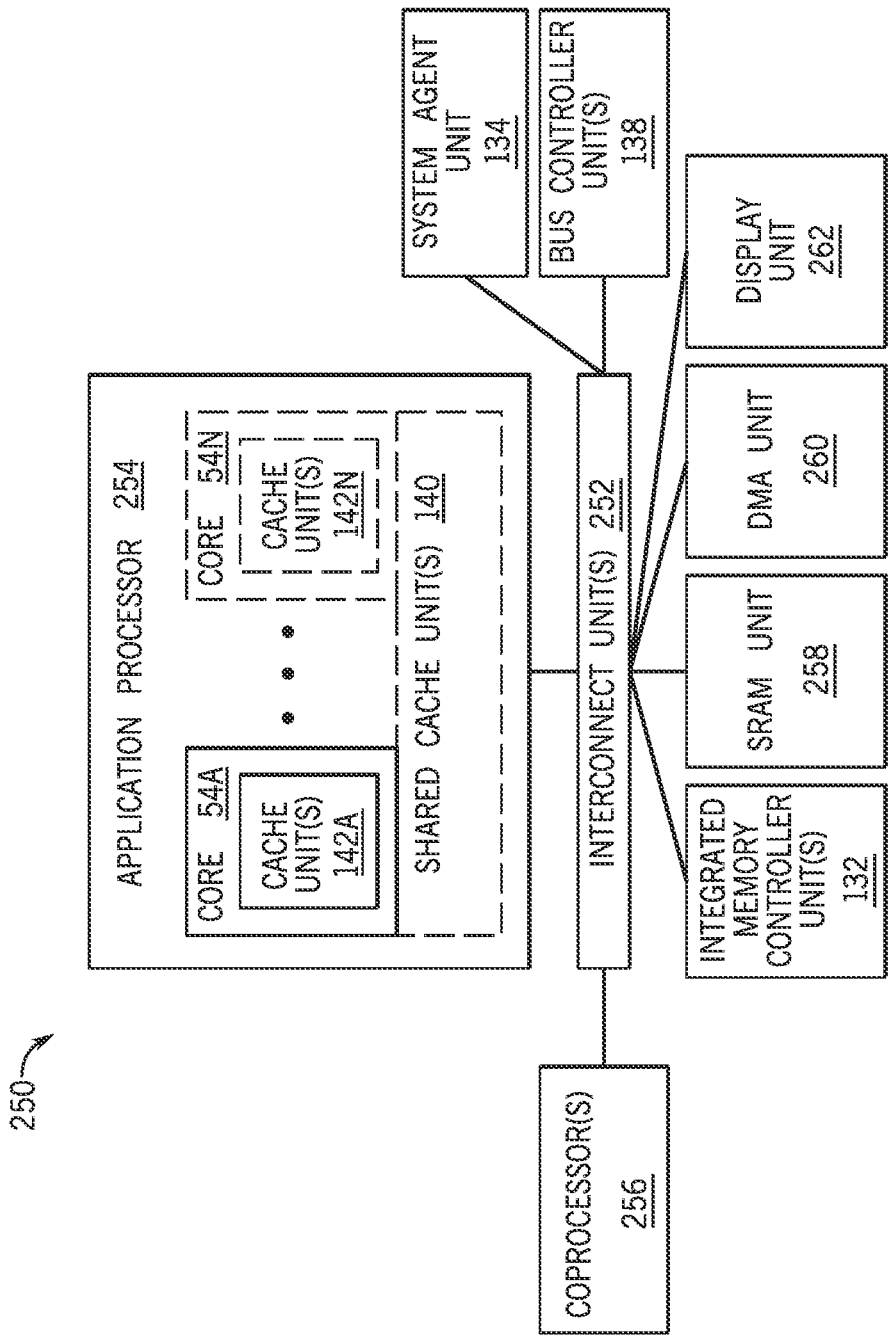
FIG. 8 is a block diagram of a system on a chip (SoC), in accordance with an embodiment of the present disclosure.

Referring now to FIG. 8, shown is a block diagram of a SoC 250 in accordance with an embodiment of the present disclosure. Similar elements in FIG. 4 have like reference numerals. Also, dashed lined boxes are optional features included in some SoCs 250. In FIG. 8, an interconnect unit(s) 252 is coupled to: an application processor 254 that includes a set of one or more cores 54A-N that includes cache units 142A-N, and shared cache unit(s) 140; a system agent unit 134; a bus controller unit(s) 138; an integrated memory controller unit(s) 132; a set or one or more coprocessors 256 that may include integrated graphics logic, an image processor, an audio processor, and/or a video processor; a static random access memory (SRAM) unit 258; a direct memory access (DMA) unit 260; and a display unit 262 to couple to one or more external displays. In an embodiment, the coprocessor(s) 256 include a special-purpose processor, such as, for example, a network or communication processor, a compression engine, a GPGPU, a high-throughput MIC processor, an embedded processor, or the like.

Embodiments of the mechanisms disclosed herein may be implemented in hardware, software, firmware, or a combination of such implementation approaches. Embodiments of the disclosure may be implemented as computer programs and/or program code executing on programmable systems including at least one processor, a storage system (including volatile and non-volatile memory and/or storage elements), at least one input device, and at least one output device.

Program code, such as data 224 illustrated in FIG. 6, may be applied to input instructions to perform the functions described herein and generate output information. The output information may be applied to one or more output devices. For purposes of this application, a processing system includes any system that has a processor, such as, for example, a digital signal processor (DSP), a microcontroller, an application-specific integrated circuit (ASIC), or a microprocessor.

The program code may be implemented in a high-level procedural or object-oriented programming language to communicate with a processing system. The program code may also be implemented in an assembly language or in a machine language. In fact, the mechanisms described herein are not limited in scope to any particular programming language. In any case, the language may be a compiled language or an interpreted language.

One or more aspects of at least one embodiment may be implemented by representative instructions stored on a machine-readable medium that represents various logic within the processor that, when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic cards, optical cards, or any other type of media suitable for storing electronic instructions.

Accordingly, embodiments of the embodiment include non-transitory, tangible machine-readable media containing instructions or containing design data, such as designs in Hardware Description Language (HDL) that may define structures, circuits, apparatuses, processors and/or system features described herein. Such embodiments may also be referred to as program products.

Emulation

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert instructions to one or more other instructions to be processed by the core. The instruction converter may be implemented in software, hardware, firmware, or a combination thereof. The instruction converter may be implemented on processor, off processor, or part on and part off processor.

Figure 9:
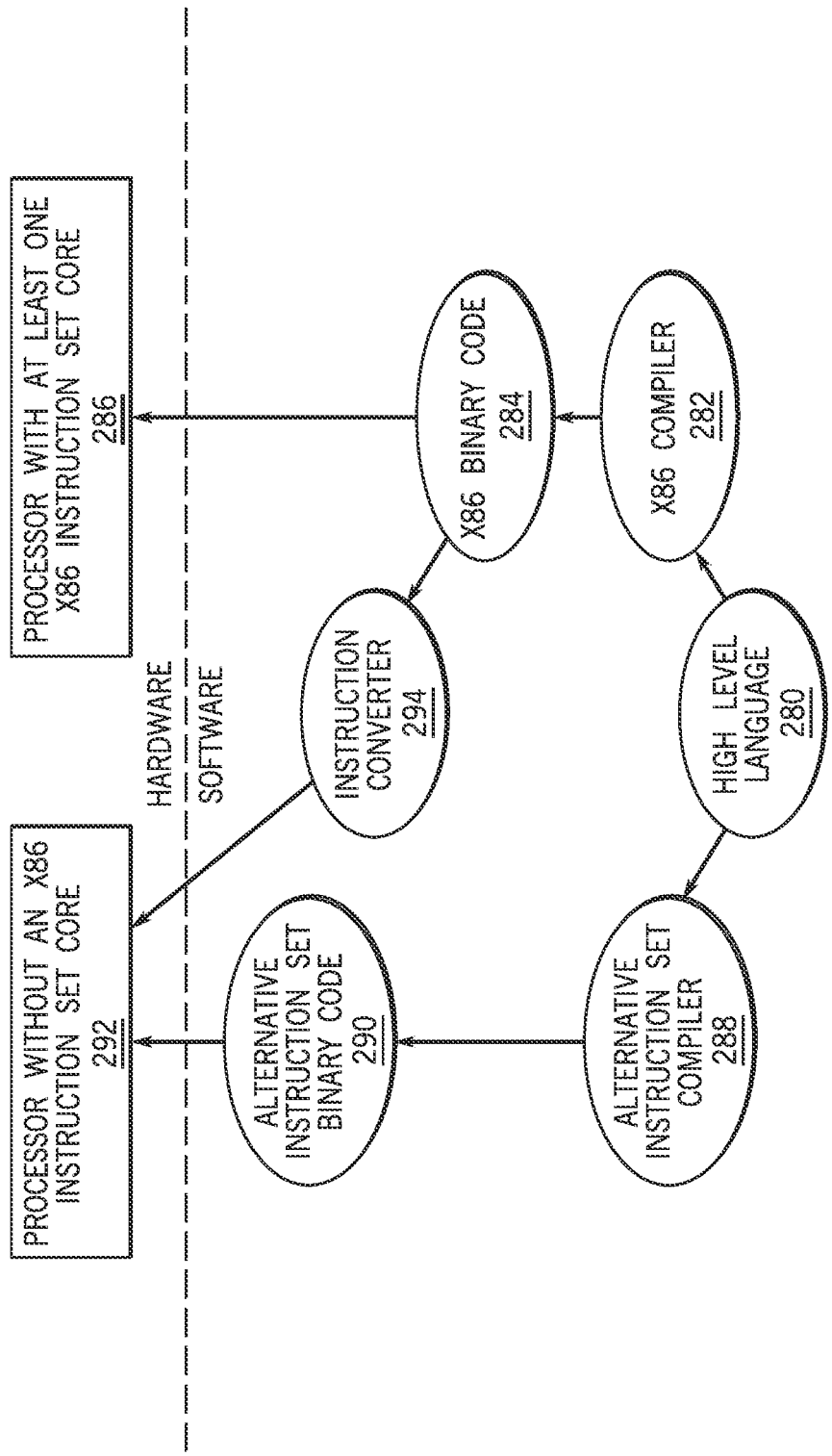
FIG. 9 is a block diagram contrasting the use of a software instruction converter to convert binary instructions in a source instruction set to binary instructions in a target instruction set, in accordance with an embodiment of the present disclosure.

FIG. 9 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or any combinations thereof. FIG. 9 shows a program in a high-level language 280 may be compiled using an x86 compiler 282 to generate x86 binary code 284 that may be natively executed by a processor with at least one x86 instruction set core 286. The processor with at least one x86 instruction set core 286 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 282 represents a compiler that is operable to generate x86 binary code 284 (e.g., object code) that can, with or without additional linkage processing, be executed on the processor with at least one x86 instruction set core 286.

Similarly, FIG. 9 shows the program in the high-level language 280 may be compiled using an alternative instruction set compiler 288 to generate alternative instruction set binary code 290 that may be natively executed by a processor without at least one x86 instruction set core 292 (e.g., a processor with processor cores 54 that execute the MIPS instruction set of MIPS Technologies of Sunnyvale, CA and/or that execute the ARM instruction set of ARM Holdings of Sunnyvale, CA). An instruction converter 294 is used to convert the x86 binary code 284 into code that may be natively executed by the processor without an x86 instruction set core 292. This converted code is not likely to be the same as the alternative instruction set binary code 290 because an instruction converter capable of this is difficult to make; however, the converted code may accomplish the general operation and be made up of instructions from the alternative instruction set. Thus, the instruction converter 294 represents software, firmware, hardware, or a combination thereof that, through emulation, simulation or any other process, allows a processor or other electronic device that does not have an x86 instruction set processor or core to execute the x86 binary code 284.

Clock Frequency Analysis

As mentioned above, an SoC uses a clock generator to generate one or more clock signals to synchronize operations of the SoC in one or more of the components discussed previously and/or other circuitry. For example, the clock generator may include one or more timing sources (e.g., clocks), such as a real-time clock, a crystal oscillator, an RC-Oscillator, a phase-locked loop (PLL) oscillator, a software-controlled clock, or the like. The clock signals generated by the clock generator may vary in frequency and may be used by the SoC to synchronize various operations executed by the SoC. In order to monitor or maintain the accuracy of such clock signals, the frequencies of each clock signal may be measured using an oscilloscope before the SoC is distributed from a manufacturer. However, a person typically has to manually configure each clock used to generate the clock signals individually. Additionally, once respective chips associated with the SoC have been distributed from the manufacturer, measuring the clock frequencies of each clock signal is typically unavailable.

Figure 10:
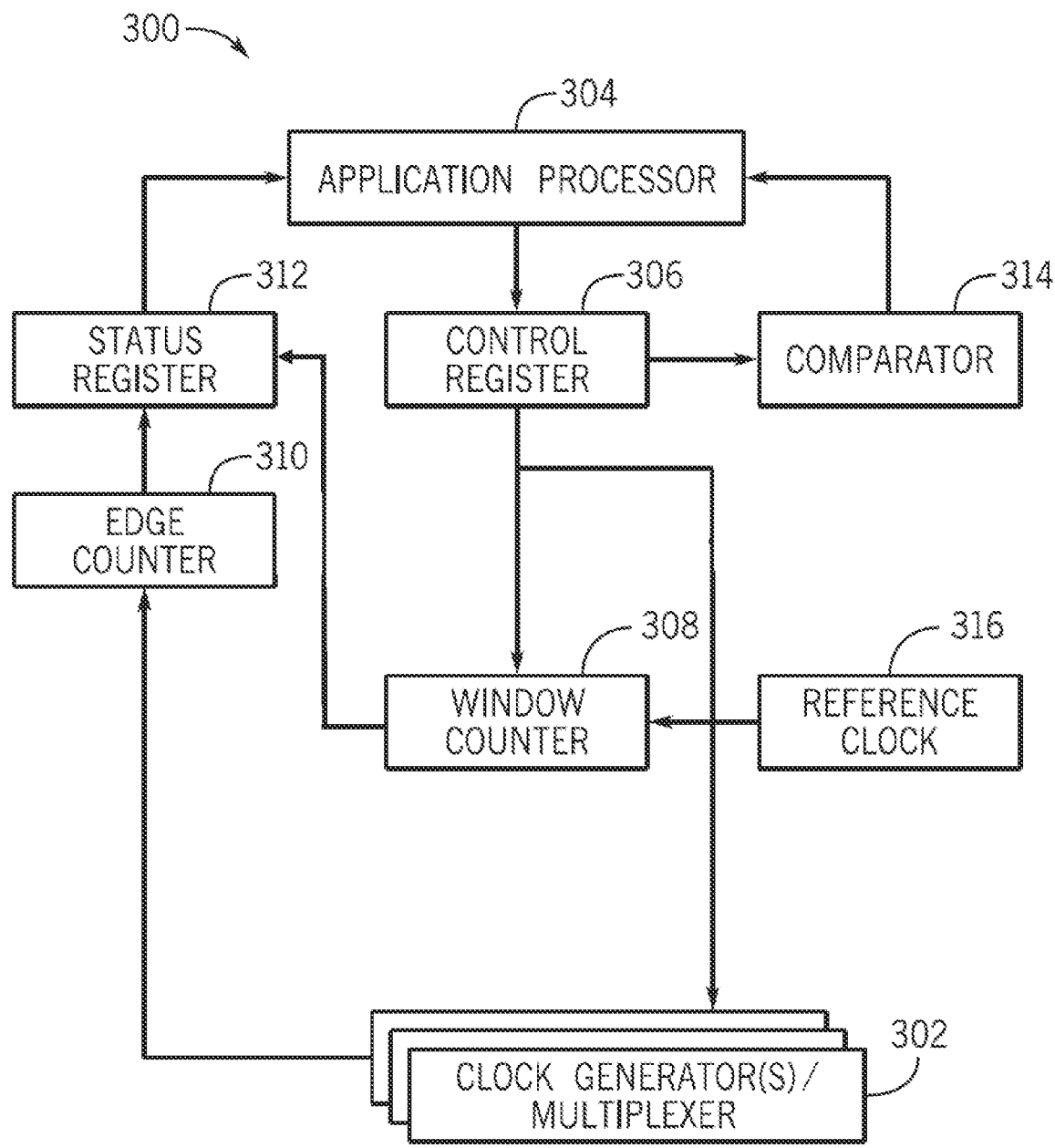
FIG. 10 is a block diagram of a clock analysis system that may measure and analyze one or more clock frequencies generated by one or more clock generators of an SoC, in accordance with an embodiment of the present disclosure.

Accordingly, FIG. 10 shows a block diagram of a clock analysis system 300 that may measure and analyze one or more clock frequencies generated by one or more clock generators 302 (e.g., clock generator(s) or a multiplexer associated with the clock generator(s)) of an SoC. For instance, the clock analysis system 300 may be part of any of the foregoing processors/SoCs. As illustrated in FIG. 10, the clock analysis system 300 includes an application processor 304 that may execute a software application that generates a graphical user interface (GUI) that may facilitate measurement of one or more clock frequencies of various types of clocks provided via the clock generators 302. For example, a user of the software application may configure a process for measuring a clock frequency of a particular clock via the GUI. In certain embodiments, the user may select a first clock of the SoC for analysis to determine the clock frequency of the selected clock, a second clock that has a known frequency as a control (e.g., a reference clock), and a window that defines a number of cycles associated with the reference clock in which to compare the frequency of the selected clock to the frequency of the reference clock. The reference clock may be any suitable clock having a lower frequency than an expected frequency of the selected clock. In some embodiments, the reference clock may be a crystal clock, a real-time clock, a clock having a clock frequency less than or equal to 24 megahertz (MHz), or the like.

In certain embodiments, the user may select fewer characteristics or more characteristics for configuring the process for measuring the clock frequency. For instance, the software application may automatically set the reference clock to a particular clock of the SoC (e.g., a clock with the slowest known frequency), or the software application may automatically select the window that defines the number of cycles in which to compare the frequency of the selected clock to the frequency of the reference clock. The software application may also prevent user selection of a reference clock having a higher frequency than the selected clock.

After receiving one or more indications (e.g., user input) of the selected clock, the reference clock, and the window, the software application may determine the frequency of the selected clock signal in relation to the frequency of the reference clock signal. For instance, the application processor 304 may transmit respective indications of the selected clock, the reference clock, and the window to a control register 306. After receiving the respective indications of the selected clock, the reference clock, and the window, the control register 306 may store indications of the selected clock, the reference clock, and the window. Based on the respective indications of the selected clock, the reference clock, and the window in the control register 306, a window counter 308 may be used to determine the frequency of the reference clock signal within the window, and an edge counter 310 may be used to determine the frequency of the selected clock signal within the window. For example, the window counter 308 may receive the reference clock signal generated by a reference clock 316 (e.g., reference clock generator) and count the number of edges (e.g., rising edges or falling edges) of the reference clock signal within the window. Similarly, the edge counter 310 may receive the clock signal generated by the selected clock from the clock generator 302 and count the number of edges of the selected clock signal within the window.

After the window counter 308 counts the number of edges of the reference clock signal within the window, the window counter 308 transmits an indication of the number of edges of the reference clock signal to the status registry 312 and/or other circuitry. Similarly, the edge counter 310 may transmit an indication of the number of edges of the selected clock signal to the status register 312 and/or other circuitry. After receiving the respective indications of the number of edges of the reference clock signal and the number of edges of the selected clock signal, the status register 312 may store respective indications of the number of edges of the reference clock signal and the number of edges of the selected clock signal. In some embodiments, the status register 312 may also store one or more indications that represent that counting the number of edges in the reference clock signal in the window and/or counting the number of edges in the selected clock signal in the window has been completed.

After the status register 312 has stored respective indications of the number of edges of the reference clock signal and the number of edges of the selected clock signal, the application processor 304 may then determine a measured ratio associated with the selected clock. For example, the measured ratio may be equal to the number of edges of the selected clock signal divided by the number of edges of the reference clock signal. The application processor 304 may read the respective indications of the number of edges of the reference clock signal and the number of edges of the selected clock signal in the status register 312 and determine the measured ratio associated with the selected clock signal.

After determining the measured ratio associated with the selected clock signal, the application processor 304 may then determine the frequency of the selected clock signal with respect to the frequency of the reference clock signal. Since the frequency of the reference clock signal is known, the application processor 304 may calculate the frequency of the selected clock signal by multiplying the measured ratio associated with the selected clock signal with the frequency of the reference clock signal. After determining the frequency of a selected clock signal, the application processor 304 may then transmit a graphical representation of the frequency of the selected clock signal to a display device for display via the graphical user interface of the software application. In this way, the application processor 304 may automatically determine the frequency of the selected clock signal with minimal human intervention.

In certain embodiments, the user may use the software application to measure the clock frequency of more than one clock. For instance, the user may select multiple clocks via the graphical user interface of the software application for analysis to determine the respective clock frequencies of the selected clocks. In some embodiments, the user may select the same reference clock via the graphical user interface for determining the respective clock frequencies of the selected clocks. In other embodiments, the user may select one or more different reference clocks via the graphical user interface for determining the respective clock frequencies of the selected clocks.

In any case, the clock analysis system 300 may perform the process described above to determine the respective clock frequencies of the selected clocks sequentially, in parallel, or partially in parallel. For example, after the clock analysis system 300 determines the frequency of a first selected clock, the clock analysis system 300 may repeat the process sequentially to determine the frequency of a second selected clock, and so forth, until the respective frequencies of each selected clock have been determined. Alternatively, the clock analysis system 300 may determine the clock frequencies of the selected clocks in parallel or partially in parallel. For example, after the status register 312 receives respective indications of the number of edges of the reference signal and the number of edges of the first selected clock signal, the application processor 304 may transmit an indication of a second selected clock to the control register 306. Thereafter, the clock analysis system 300 may perform the process described above to determine the clock frequency of the second selected clock. In this way, each clock selected by the user may be automatically configured without requiring a person to configure each clock manually. Additionally or alternatively, multiple components may be duplicated for parallel processing, such as multiple control registers 306, window counters 308, edge counters 310, status registers 312, and/or comparators 314.

In certain embodiments, the clock analysis system 300 may also monitor one or more clocks for abnormal behavior or possible tampering by an external entity during run-time of one or more operations. For example, the user may select a particular clock for continuous monitoring via the graphical user interface of the software application. The clock analysis system 300 may then continuously monitor the frequency of the selected clock signal to determine if the frequency of the selected clock signal is deviating from an expected frequency of the selected clock signal. For instance, the clock analysis system 300 may determine an actual ratio between the frequency of the selected clock signal and the frequency of the reference clock signal and compare the actual ratio to an expected ratio between the frequency of the selected clock signal and the frequency of the reference clock signal. If the clock analysis system 300 determines a deviation between the actual ratio and the expected ratio, the clock analysis system 300 may determine that the selected clock is exhibiting abnormal behavior or possible tampering by an external entity and notify the user (e.g., via the graphical user interface of the software application).

For instance, the application processor 304 may receive an indication (e.g., user input) of the selected clock from the graphical user interface and then transmit the indication of the selected clock to the control register 306. After receiving the indication of the selected clock, the control register 306 may store an indication of the selected clock. Based on the stored indication of the selected clock in the control register 306, a comparator 314 may continuously monitor the frequency of the selected clock signal with respect to the frequency of a reference clock signal to determine if an expected ratio between the frequency of the selected clock signal and the frequency of the reference clock signal deviates away more than a threshold value from an actual ratio between the actual frequency of the selected clock signal and the actual frequency of the reference clock signal. For instance, the comparator 314 may read an indication of the expected ratio in the control register 306. The expected ratio may be equal to an expected number of edges of the selected clock signal within a respective window divided by the number of edges of the reference clock signal within the same window. In some embodiments, the comparator 314 may be at least partially implemented using instructions executed by the application processor 304.

In certain embodiments, the application processor 304 may retrieve the expected ratio from a memory accessible by the application processor 304 and transmit an indication of the expected ratio to the control register 306 for storage. For example, the memory may store one or more expected ratios for corresponding pairs of clocks (e.g., a type of selected clock and a type of reference clock pair). In other embodiments, the user may provide a user input indicative of the expected ratio via the graphical user interface. In such embodiments, the application processor 304 may transmit the indication of the selected clock and an indication of the expected ratio for the selected clock to the control register 306 for storage.

In any case, the application processor 304 may continuously determine an actual ratio between the actual frequency of the selected clock signal and the actual frequency of the reference clock signal. As described above, the application processor 304 may transmit an indication of the selected clock to the control register 306. In some embodiments, the application processor 304 may also transmit an indication of the reference clock and the window to the control register 306. In other embodiments, the control register 306 may store the indication of the reference clock and the window by default. Based on the respective indications of the selected clock, the reference clock, and the window in the control register 306, the window counter 308 may count the number of edges of the reference clock signal within the window, and the edge counter 310 may count the number of edges of the selected clock signal within the window. In particular, the window counter 308 may receive the clock signal generated by the reference clock 316 and count the number of edges (e.g., rising edges or falling edges) of the reference clock signal within the window. The window counter 308 may then transmit an indication of the number of edges of the reference clock signal within the window to the status register 312 for storage. Similarly, the edge counter 310 may receive the clock signal generated by the selected clock from the clock generator 302 and count the number of edges of the selected clock signal within the window. The edge counter 310 may then transmit an indication of the number of edges of the reference clock signal within the window to the status register 312 for storage. After the status register 312 has stored respective indications of the number of edges of the reference clock signal and the number of edges of the selected clock signal, the application processor 304 may determine the actual ratio between the frequency of the reference clock signal and the actual frequency of the selected clock signal based on the number of edges of the selected clock signal and the number of edges of the reference clock signal. Additionally or alternatively, the application processor 304 may determine the actual frequency of the selected clock signal using the actual ratio and the known value of the frequency of the reference clock signal.

After determining the actual ratio between the frequency of the selected clock signal and the frequency of the reference clock signal, the application processor 304 may transmit an indication of the actual ratio to the control register 306 for storage. In other embodiments, the application processor 304 may transmit the indication of the actual ratio directly to the comparator 314. In any case, based on the indication of the actual ratio, the comparator 314 may compare the expected ratio with the actual ratio to determine if the expected ratio deviates from the actual ratio. If the comparator 314 determines that the expected ratio deviates from the actual ratio, the comparator 314 may trigger the release of an error interrupt to the application processor 304. The application processor 304 may then transmit a notification to the user (e.g., via the graphical user interface) to provide an indication that the selected clock may be exhibiting abnormal behavior or possible tampering by an external entity.

Alternatively, if the comparator 314 determines that the expected ratio does not deviate from the actual ratio by more than a threshold value (e.g., less than 1 cycle), the comparator 314 may continue monitoring the selected clock signal to determine if a deviation between the actual ratio and the expected ratio is present for a next window of the selected clock signal and the reference clock signal. In this way, the clock analysis system 300 may monitor one or more clocks for abnormal behavior or possible tampering by an external entity during run-time of one or more operations.

Figure 11:
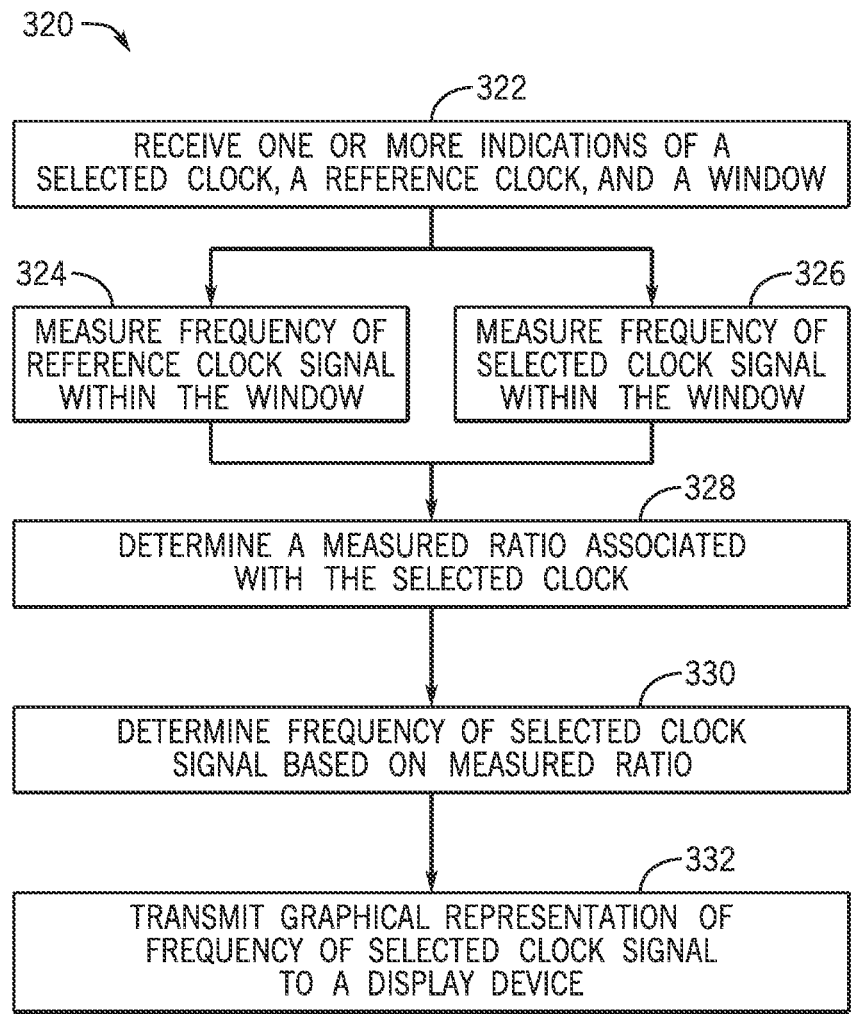
FIG. 11 is a flow diagram of a process for measuring and analyzing one or more clock frequencies generated by one or more clock generators of an SoC, in accordance with an embodiment of the present disclosure.

With the foregoing in mind, FIG. 11 shows a flow diagram of a process 320 that may be used by any of the foregoing processors/SoCs (e.g., the clock analysis system 300) to measure and analyze one or more clock frequencies generated by one or more clock generators 302. As illustrated in FIG. 11, an application processor 304 of the SoC may receive one or more indications of characteristics for configuring a process for measuring a clock frequency of a selected clock (block 322). For instance, the application processor 304 may execute a software application that generates a graphical user interface that facilitates measurement of one or more clock frequencies of various types of clocks provided via the clock generators 302. Through the graphical user interface, the user may select a first clock of the SoC for analysis to determine the clock frequency of the selected clock, a second clock that has a known frequency as the reference clock, and a window that defines a number of cycles associated with the reference clock in which to compare the frequency of the selected clock to the frequency of the reference clock. In some embodiments, the application processor 304 may utilize other types of interfaces, such as device-to-device interfaces, jumper-based interfaces, character user interfaces (e.g., command-line user interface), and/or other non-graphical user interfaces to receive an indication (e.g., a selection) of the selected clock, reference clock, and/or window.

After receiving one or more indications of the selected clock, the reference clock, and the window, the SoC may measure the frequency of the reference clock signal within the window (block 324) and measure the frequency of the selected clock signal within the window (block 326). For instance, the application processor 304 may transmit respective indications of the selected clock, the reference clock, and the window to the control register 306 of the SoC for storage. Based on the respective indications of the selected clock, the reference clock, and the window in the control register 306, the SoC (e.g., application processor 304 of the SoC) may determine the frequency of the reference clock signal within the window, and the SoC may determine the frequency of the selected clock signal within the window. For example, the window counter 308 of the SoC may receive the reference clock signal generated by the reference clock 316 and count the number of edges of the reference clock signal within the window. Similarly, the edge counter 310 of the SoC may receive the clock signal generated by the selected clock from the clock generator 302 and count the number of edges of the selected clock signal within the window. Using these counted edges and the known reference clock, the application processor 304 of the SoC may determine the frequency of the selected clock signal. In some embodiments, the application processor 304 of the SoC may use only the numbers of edges counted as the measure of frequencies of the respective reference clock signal and the selected clock signal without computing an actual frequency as part of the measurement.

After measuring the frequency of the reference clock signal within the window and measuring the selected clock signal within the window, the SoC may determine a measured ratio associated with the selected clock (block 328). For example, a status register 312 of the SoC may receive an indication of the number of edges of the reference clock signal from the window counter 308 and an indication of the number of edges of the selected clock signal from the edge counter 310. Based on the respective indications of the number of edges of the reference clock signal and the number of edges of the selected clock signal in the status register 312, the application processor 304 of the SoC may then determine the measured ratio associated with the selected clock by dividing the number of edges of the selected clock signal by the number of edges of the reference clock signal.

After determining the measured ratio associated with the selected clock signal, the SoC may determine the frequency of the selected clock signal with respect to the frequency of the reference clock signal (block 330). The application processor 304 may then determine the frequency of the selected clock signal with respect to the frequency of the reference clock signal. Since the frequency of the reference clock signal is known, the application processor 304 may calculate the frequency of the selected clock signal by multiplying the measured ratio associated with the selected clock signal with the frequency of the reference clock signal. After determining the frequency of a selected clock signal, the SoC may then transmit a graphical representation of the frequency of the selected clock signal to a display device for display (block 332). Alternatively, or additionally, the SoC may use the selected clock for executing one or more SoC operations after determining that the frequency of the selected clock signal is within a threshold of an expected frequency of the selected clock signal. For example, the SoC may use the selected clock to synchronize various operations executed by the SoC during run-time of the operations.

As mentioned above, the user may use the software application to measure the clock frequency of more than one clock sequentially and/or consecutively. For instance, the user may select multiple clocks via the graphical user interface of the software application for analysis to determine the respective clock frequencies of the selected clocks. Accordingly, the SoC may repeat blocks 324 to 328 of process 320 for each clock selected by the user.

Figure 12:
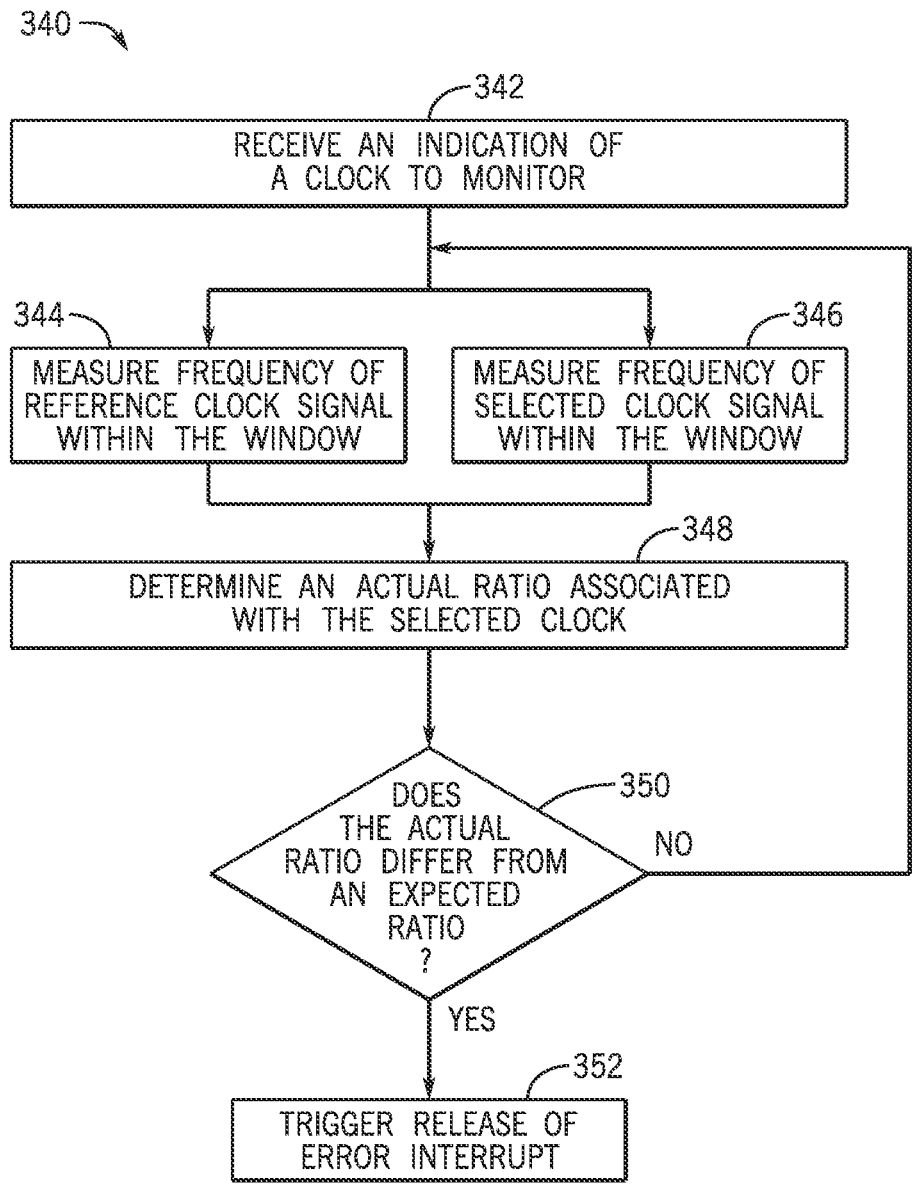
FIG. 12 is a flow diagram of a process for monitoring a clock of an SoC to determine whether the clock is exhibiting abnormal behavior, in accordance with an embodiment of the present disclosure.

Additionally, as mentioned above, one or more clocks of the SoC may be monitored for abnormal behavior or possible tampering by an external entity during run-time of one or more operations. FIG. 12 shows a flow diagram of a process 340 that may be used by any of the foregoing processors/SoCs (e.g., using the clock analysis system 300) to monitor the clocks of the SoC. As illustrated in FIG. 12, the SoC receives an indication (e.g., user input) of a particular clock to monitor (block 342). For example, the application processor 304 of the SoC may execute a software application that generates a graphical user interface through which the user may select the clock. The SoC may then continuously monitor the frequency of the selected clock signal to determine if the frequency of the selected clock signal is deviating from an expected frequency of the selected clock signal. Alternatively, the indication may be received via any of the non-graphical interfaces previously discussed.

After receiving the indication of the selected clock, the SoC may measure the frequency of the reference clock signal within a particular window (block 344) and measure the frequency of the selected clock signal within the window (block 346). For instance, blocks 344 and 346 of process 340 may be substantially similar to blocks 324 and 326 as described above. After measuring the frequency of the reference clock signal within the window and measuring the selected clock signal within the window, the SoC may determine an actual ratio associated with the selected clock (block 348). For example, an application processor 304 of the SoC may determine the actual ratio between the actual frequency of the selected clock signal and the actual frequency of the reference clock signal based on a number of edges of the selected clock signal within a particular window and the number of edges of the reference clock signal within the window.

After determining the actual ratio between the frequency of the selected clock signal and the frequency of the reference clock signal, the SoC may determine whether the actual ratio deviates from an expected ratio between the frequency of the selected clock signal and the frequency of the reference clock signal (block 350). For instance, the application processor 304 of the SoC may transmit an indication of the actual ratio to a control register 306 of the SoC. Based on the indication of the actual ratio, the comparator 314 may determine if the expected ratio between the frequency of the selected clock signal and the frequency of the reference clock signal deviates from the actual ratio between the frequency of the selected clock signal within a respective window and the actual frequency of the reference clock signal within the respective window. Additionally, after determining the actual ratio between the frequency of the selected clock signal and the frequency of the reference clock signal, the application processor 304 may transmit an indication of the actual ratio to the comparator 314. The comparator 314 may then compare the expected ratio and the actual ratio to determine if the expected ratio deviates from the actual ratio. In certain embodiments, the comparator 314 may determine if the ratio deviates from the actual ratio by more than a threshold.

If the comparator 314 of the SoC determines that the expected ratio deviates from the actual ratio (e.g., by more than a threshold), the comparator 314 may trigger a release of an error interrupt to the application processor 304 (block 352). The application processor 304 may then transmit a notification to the user (e.g., via the graphical user interface) to provide an indication that the selected clock may be exhibiting abnormal behavior or possible tampering by an external entity. Alternatively, if the comparator 314 determines that the expected ratio does not deviate from the actual ratio (e.g., by more than a threshold), the comparator 314 may continue monitoring the selected clock signal to determine if a deviation between the actual ratio and the expected ratio is present for a next window of the selected clock signal and the reference clock signal. For instance, the SoC may repeat blocks 344-350 of the process 340 until the SoC determines that the actual ratio differs from the expected ratio (e.g., by more than a threshold). The SoC may then trigger the release of an error interrupt to the application processor 304 (block 352). In this way, the SoC may continuously monitor one or more clocks for abnormal behavior or possible tampering by an external entity during run-time of one or more operations.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims. For example, the techniques described herein describe different blocks of the processes 320 and 340 that may be performed by various components of an SoC. However, it should be understood that any suitable component of the SoC may perform one or more of the blocks of the processes 320 and 340.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

EXAMPLE EMBODIMENTS

Example Embodiment 1. A clock analysis system comprising a control register configured to store a frequency indication for a first clock; an edge counter configured to count a first number of edges of the first clock within a particular window; a window counter configured to count a second number of edges of a second clock within the particular window; a status register configured to store respective indications of the first number of edges from the edge counter and the second number of edges from the window counter; and an application processor configured to determine a ratio between the first number of edges and the second number of edges; determine a frequency of the first clock based on the ratio; and transmit an indication of the frequency of the first clock to a peripheral device for display.

Example Embodiment 2. The clock analysis system of example embodiment 1, wherein the second clock has a lower frequency than an expected frequency of the first clock.

Example Embodiment 3. The clock analysis system of example embodiment 1, wherein the application processor is configured to transmit user interface data to the peripheral device for display and receive the frequency indication for the first clock via a user interface using the user interface data.

Example Embodiment 4. The clock analysis system of example embodiment 3, wherein the application processor is configured to receive an additional indication of the particular window via the user interface.

Example Embodiment 5. The clock analysis system of example embodiment 1, comprising clock generator circuitry that obtains the frequency indication from the control register and controls an output frequency of the first clock from the clock generator circuitry based on the frequency indication from the control register, wherein the application processor is configured to transmit the frequency indication to the control register.

Example Embodiment 6. The clock analysis system of example embodiment 1, wherein the application processor is configured to determine the frequency of the first clock based on the ratio by multiplying the ratio by a known frequency of the second clock.

Example Embodiment 7. The clock analysis system of example embodiment 1, wherein the control register is configured to store an additional frequency indication of a third clock; and after the application processor determines the frequency of the first clock based on the ratio: the edge counter is configured to count a third number of edges of the third clock within a second window; the window counter is configured to count a fourth number of edges of the second clock within the second window; the status register is configured to store respective additional indications of the third number of edges from the edge counter and the fourth number of edges from the window counter; and the application processor is configured to determine a second ratio between the third number of edges and the fourth number of edges; determine a second frequency of the third clock based on the ratio; and transmit an indication of the second frequency of the third clock to the peripheral device for display.

Example Embodiment 8. A method, comprising: storing, by a control register of a clock analysis system, a frequency indication of a first clock; counting, by an edge counter of the clock analysis system, a first number of edges of the first clock within a particular window; counting, by a window counter of the clock analysis system, a second number of edges of a second clock within the particular window; storing, by a status register of the clock analysis system, respective indications of the first number of edges from the edge counter and the second number of edges from the window counter; determining, by an application processor of the clock analysis system, a ratio between the first number of edges and the second number of edges; determining, by the application processor, a frequency of the first clock based on the ratio; and transmitting, by the application processor, an indication of the frequency of the first clock to a peripheral device for display.

Example Embodiment 9. The method of example embodiment 8, wherein the second clock has a lower frequency than an expected frequency of the first clock.

Example Embodiment 10. The method of example embodiment 8, wherein the second clock comprises a crystal clock or a real-time clock.

Example Embodiment 11. The method of example embodiment 8, wherein the second clock has a frequency less than or equal to 24 megahertz (MHz).

Example Embodiment 12. The method of example embodiment 8, comprising transmitting, by the application processor, user interface data to the peripheral device for display and receiving, by the application processor, the frequency indication for the first clock via a user interface using the user interface data.

Example Embodiment 13. The method of example embodiment 8, comprising transmitting, by the application processor, the frequency indication of the first clock to the control register.

Example Embodiment 14. A clock analysis system, comprising: a control register configured to receive an indication of a clock to monitor; an edge counter configured to count a first number of edges of the clock within a particular window; a window counter configured to count a second number of edges of a reference clock within the particular window; a status register configured to store respective indications of the first number of edges from the edge counter and the second number of edges from the window counter; an application processor configured to determine a ratio between the first number of edges and the second number of edges; and a comparator configured to: determine whether the ratio differs from an expected ratio associated with the clock by more than a threshold; and in response to determining that the ratio differs from the expected ratio by more than a threshold, trigger an error interrupt.

Example Embodiment 15. The clock analysis system of example embodiment 14, wherein the expected ratio is a second ratio between a first expected number of edges within the particular window and a second expected number of edges within the particular window.

Example Embodiment 16. The clock analysis system of example embodiment 14, wherein the control register is configured to store one or more additional indications of the expected ratio, the reference clock, the particular window, or a combination thereof.

Example Embodiment 17. The clock analysis system of example embodiment 14, wherein the application processor of the clock analysis system is configured to transmit an indication that the clock is experiencing abnormal behavior to a peripheral device for display in response to the comparator determining that the ratio differs from the expected ratio by more than a threshold.

Example Embodiment 18. The clock analysis system of example embodiment 14, wherein the reference clock has a lower frequency than an expected frequency of the clock.

Example Embodiment 19. The clock analysis system of example embodiment 14, wherein the reference clock comprises a crystal clock or a real-time clock.

Example Embodiment 20. The clock analysis system of example embodiment 14, wherein the clock analysis system is configured to continuously determine respective ratios between respective first numbers of edges and respective second numbers of edges in respective windows and to determine whether the respective ratios differ from the expected ratio associated with the clock by more than a threshold.

What is claimed is:

1. A clock analysis system, comprising:
an edge counter;
a window counter;
a control register configured to:
    receive one or more indications of a first clock and a second clock; and
    transmit a first command to the edge counter to count a first number of edges in a first signal of the first clock within a particular window and a second command to the window counter to count a second number of edges in a second signal of the second clock within the particular window;
a status register configured to:
    receive respective indications of the first number of edges in the first signal from the edge counter and the second number of edges in the second signal from the window counter; and
    determine a ratio between the first number of edges in the first signal and the second number of edges in the second signal; and
an application processor configured to:
    transmit the one or more indications of the first clock and the second clock to the control register;
    receive an indication of the ratio from the status register;
    determine a frequency of the first clock based on the ratio; and
    transmit an indication of the frequency of the first clock to a peripheral device for display.

2. The clock analysis system of claim 1, wherein the second clock has a lower frequency than an expected frequency of the first clock.

3. The clock analysis system of claim 1, wherein the application processor is configured to transmit a user interface to the peripheral device for display and receive the one or more indications of the first clock and the second clock via the user interface.

4. The clock analysis system of claim 1, wherein the application processor is configured to receive an additional indication of the particular window via the user interface.

5. The clock analysis system of claim 1, wherein the application processor is configured to determine the frequency of the first clock based on the ratio by multiplying the ratio by a known frequency of the second clock.

6. The clock analysis system of claim 1, wherein:
the control register is configured to receive an additional indication of a third clock; and
after the application processor determines the frequency of the first clock based on the ratio:
    the control register is configured to:
        transmit a third command to the edge counter to count a third number of edges in a third signal of the third clock within a second window and a fourth command to the window counter to count a fourth number of edges in the second signal of the second clock within the second window;
    the status register is configured to:
        receive respective additional indications of the third number of edges in the third signal from the edge counter and the fourth number of edges in the second signal from the window counter; and
        determine a second ratio between the third number of edges in the third signal and the fourth number of edges in the second signal; and the application processor is configured to:
receive the second ratio from the status register;
determine a second frequency of the third clock based on the ratio; and
transmit an indication of the second frequency of the third clock to the peripheral device for display.

7. A method, comprising:
receiving, by a control register of a clock analysis system, one or more indications of a first clock and a second clock, wherein the second clock has a frequency less than or equal to 24 megahertz (MHz);
transmitting, by the control register, a first command to an edge counter of the clock analysis system to count a first number of edges in a first signal of the first clock within a particular window and a second command to a window counter of the clock analysis system to count a second number of edges in a second signal of the second clock within the particular window;
counting, by the edge counter, the first number of edges in the first signal of the first clock within the particular window;
counting, by the window counter, the second number of edges in the second signal of the second clock within the particular window;
receiving, a status register of the clock analysis system, respective indications of the first number of edges in the first signal from the edge counter and the second number of edges in the second signal from the window counter;
determining, by the status register, a ratio between the first number of edges in the first signal and the second number of edges in the second signal;
receiving, by an application processor of the clock analysis system, an indication of the ratio from the status register;
determining, by the application processor, a frequency of the first clock based on the ratio; and
transmitting, by the application processor, an indication of the frequency of the first clock to a peripheral device for display.

8. The method of claim 7, wherein the second clock has a lower frequency than the first clock.

9. The method of claim 7, wherein the second clock comprises a crystal clock or a real-time clock.

10. The method of claim 7, comprising transmitting, by the application processor, a user interface to the peripheral device for display and receiving, by the application processor, the one or more indications of the first clock and the second clock via the user interface.

11. The method of claim 10, comprising transmitting, by the application processor, the one or more indications of the first clock and the second clock to the control register.

12. A clock analysis system, comprising:
an edge counter;
a window counter;
a control register configured to:
receive an indication of a clock to monitor; and
transmit a first command to the edge counter to count a first number of edges in a first signal of the clock within a particular window and a second command to the window counter to count a second number of edges in a second signal of a reference clock within the particular window;
a status register configured to:
receive respective indications of the first number of edges in the first signal from the edge counter and the second number of edges in the second signal from the window counter; and
determine a ratio between the first number of edges in the first signal and the second number of edges in the second signal; and
a comparator configured to:
determine whether the ratio differs from an expected ratio associated with the clock by more than a threshold, wherein the expected ratio is a second ratio between a first expected number of edges in the first signal within the particular window and a second expected number of edges in the second signal within the particular window; and
in response to determining that the ratio differs from the expected ratio by more than a threshold, trigger a release of an error interrupt.

13. The clock analysis system of claim 12, wherein the control register is configured to receive one or more additional indications of the expected ratio, the reference clock, the particular window, or a combination thereof.

14. The clock analysis system of claim 12, wherein an application processor of the clock analysis system is configured to transmit an indication that the clock is experiencing abnormal behavior to a peripheral device for display in response to the comparator determining that the ratio differs from the expected ratio by more than a threshold.

15. The clock analysis system of claim 12, wherein the reference clock has a lower frequency than an expected frequency of the clock.

16. The clock analysis system of claim 12, wherein the reference clock comprises a crystal clock or a real-time clock.

17. The clock analysis system of claim 12, wherein the clock analysis system is configured to continuously determine respective ratios between respective first numbers of edges in the first signal and respective second numbers of edges in the second signal and determine whether the respective ratios differ from the expected ratio associated with the clock by more than a threshold.

* * * * *